US011394429B2

(12) United States Patent
Wu

(10) Patent No.: US 11,394,429 B2
(45) Date of Patent: Jul. 19, 2022

(54) PANEL HAVING INTEGRATED ANTENNAS FOR ENHANCING RANGE OF TELECOMMUNICATION SIGNAL TRANSMISSIONS INSIDE BUILDINGS

(71) Applicant: DuPont Electronics, Inc., Wilmington, DE (US)

(72) Inventor: Wei Wu, Hockessin, DE (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 35 days.

(21) Appl. No.: 17/109,273

(22) Filed: Dec. 2, 2020

(65) Prior Publication Data

US 2022/0173770 A1    Jun. 2, 2022

(51) Int. Cl.
*H01Q 1/38* (2006.01)
*H04B 5/00* (2006.01)
*H04B 7/155* (2006.01)

(52) U.S. Cl.
CPC ......... *H04B 5/0031* (2013.01); *H04B 5/0081* (2013.01); *H04B 7/15528* (2013.01); *H04B 7/15564* (2013.01); *H01Q 1/38* (2013.01)

(58) Field of Classification Search
CPC ........ H01Q 1/38; H01Q 1/243; H01Q 21/065; H01Q 1/50; H01Q 21/08; H01Q 1/48; H01Q 21/00; H01Q 1/2283; H01Q 21/28; H01Q 21/0006; H02J 5/005; H02J 50/005; H02J 50/12; H02J 50/80; H02J 50/70; G09G 2320/0626; G09G 2360/144; G09G 5/003; G09G 5/10
USPC ........................................................ 375/262
See application file for complete search history.

(56) References Cited

U.S. PATENT DOCUMENTS

| 6,384,790 B2 | 5/2002 | Dishart et al. |
| 7,342,547 B2 | 3/2008 | Maniwa et al. |
| 7,379,028 B2 | 5/2008 | Hisaeda |
| 8,576,130 B2 | 11/2013 | Dai |
| 9,406,996 B2 | 8/2016 | Lee et al. |
| 9,413,056 B2 | 8/2016 | Hu |

(Continued)

OTHER PUBLICATIONS

Dama et al., "MIMI Indoor Propagation Prediction using 3D Shoot-and-Bounce Ray (SBR) Tracing Technique for 2.4 GHz and 5 GHz," Proceedings of the 5th European Conference on Atennas and Propagation, 2011, pp. 1655-1658.

(Continued)

*Primary Examiner* — Eva Y Puente
(74) *Attorney, Agent, or Firm* — Cantor Colburn LLP

(57) ABSTRACT

A construction panel having integrated antennas for enhancing the range of telecommunication signal transmissions inside buildings includes multiple layers, including a first layer and a second layer. The construction panel further includes a first antenna on the first layer. The first antenna transfers a telecommunication signal that is incident on the first layer. The construction panel further includes a second antenna on the second layer. The first antenna transmits the telecommunication signal to the second antenna through the first layer using near field coupling. A wavelength of the telecommunication signal is more than a distance between the first antenna and the second antenna. The second antenna causes the telecommunication signal to radiate on the opposite side of the first layer. One or more methods to manufacture the construction panel are also described.

20 Claims, 10 Drawing Sheets

(56) References Cited

U.S. PATENT DOCUMENTS

| | | | |
|---|---|---|---|
| 9,735,474 B2* | 8/2017 | Shmuel | H01Q 1/088 |
| 9,837,707 B2 | 12/2017 | Villarroel et al. | |
| 10,264,222 B2 | 4/2019 | Khan | |
| 10,362,463 B1* | 7/2019 | Gloss | H04B 5/02 |
| 10,486,395 B2 | 11/2019 | Labrot et al. | |
| 10,547,386 B2 | 1/2020 | Ashrafi | |
| 2009/0047900 A1 | 2/2009 | Cruz et al. | |
| 2011/0169705 A1 | 7/2011 | Goldberger | |
| 2012/0287003 A1* | 11/2012 | Kao | H01Q 1/243 |
| | | | 343/702 |
| 2014/0008347 A1 | 1/2014 | Sagawa et al. | |
| 2015/0188227 A1* | 7/2015 | Schaefer | G06K 19/07783 |
| | | | 343/788 |
| 2016/0294446 A1* | 10/2016 | Rumler | F24F 11/30 |
| 2017/0256865 A1 | 9/2017 | Sikes et al. | |
| 2017/0302771 A1* | 10/2017 | Kim | H04M 1/0266 |
| 2018/0037007 A1 | 2/2018 | Droste et al. | |
| 2018/0123692 A1 | 5/2018 | Leiba | |
| 2019/0081706 A1 | 3/2019 | Neilson et al. | |
| 2019/0165448 A1 | 5/2019 | Polehn et al. | |
| 2020/0192542 A1* | 6/2020 | Chang | G09G 3/3225 |

OTHER PUBLICATIONS

Li et al., "Validation of a Geometry-Based Statistical mmWave Channel Model Using Ray-Tracing Simulation," IEEE 31st Vehicular Technology Conference, 2015, 5 pages.

Wallace et al., "A Comparison of Indoor MIMO Measurements and Ray-Tracing at 24 and 2.55 GHz," IEEE Transactions on Antennas and Propagation, vol. 65, No. 12, Dec. 2017, pp. 6656-6668.

\* cited by examiner

PANEL HAVING INTEGRATED ANTENNAS FOR ENHANCING RANGE OF TELECOMMUNICATION SIGNAL TRANSMISSIONS INSIDE BUILDINGS

BACKGROUND

The present invention relates in general to construction panels and a method of manufacturing the same, and more specifically, the present invention relates to a construction panel having an integrated antenna network configured and arranged to enhance the range of telecommunication signal transmissions inside buildings that use the construction panel.

We are increasingly depending on telecommunications networks. Telecommunications networks have prevalently become wireless. Such wireless telecommunication uses electromagnetic waves in general, and microwave and millimeter-waves in particular, for example, 5G networks. As the wavelength increases the attenuation of the signal becomes more pronounced. It is a significant challenge to maintain signal strength within the built environment. Progress in the technology of telecommunications networks includes increases in bandwidth and download speeds. Due to such improvements, it is expected that the telecommunications networks will not just serve cellphones like existing cellular networks, but also be used for internet service for computing systems like, laptops and desktop computers. Further, the telecommunications networks facilitate new applications in internet of things (IoT) and machine to machine areas.

SUMMARY

According to one or more embodiments of the present invention, a construction panel includes multiple layers, including a first layer and a second layer. The construction panel further includes a first antenna on the first layer. The first antenna transfers a telecommunication signal that is incident on the first layer. The construction panel further includes a second antenna on the second layer. The first antenna transmits the telecommunication signal to the second antenna through the first layer using near field coupling. A wavelength of the telecommunication signal is more than a distance between the first antenna and the second antenna. The second antenna causes the telecommunication signal to radiate on the opposite side of the first layer.

In one or more embodiments of the present invention, the first antenna is an array of antennas. In one or more embodiments of the present invention, the second antenna is an array of antennas.

In one or more embodiments of the present invention, the first antenna is added to the first layer using one of etching, printing, plating, and laminating.

In one or more embodiments of the present invention, the construction panel further includes a third antenna on a third layer. The second antenna transmits the telecommunication signal to the third antenna using near field coupling. The wavelength of the telecommunication signal is more than a distance between the second antenna and the third antenna. The third antenna causes the telecommunication signal to radiate on the opposite side of the first layer.

In one or more embodiments of the present invention, the first antenna is laminated on an exterior surface of the first layer. The first antenna is laminated using a lamination sheet that is a flexible substrate with a dielectric absorption loss less than a predetermined threshold value that is associated with a frequency range of the telecommunication signal.

In one or more embodiments of the present invention, the first antenna is printed on the first layer.

In one or more embodiments of the present invention, the second antenna is aligned with the first antenna at a predetermined offset and orientation. The predetermined offset reduces the attenuation loss and reflection loss of the telecommunication signal through the first layer.

In one or more embodiments of the present invention, the first layer is on an exterior side of the base sheet, the exterior side being an exposed part of a building, and the second layer is on an interior side of the base sheet, the interior side facing inside the building.

In one or more embodiments of the present invention, the second antenna that is on the interior side of the base sheet is connected to a transceiver.

In one or more embodiments of the present invention, the first antenna and the second antenna are unpowered antennas.

In one or more embodiments of the present invention, the construction panel is a glass sheet that has a low emissivity coating.

According to one or more embodiments of the present invention, a method to manufacture a construction panel includes adding, to a first layer of a base sheet, a first antenna. The first antenna transfers, through the base sheet, a telecommunication signal that is incident on the first layer of the base sheet, the telecommunication signal being a 5G signal. The method further includes adding, to a second layer of the base sheet, a second antenna, wherein the first antenna transmits the telecommunication signal to the second antenna using near field coupling. A distance between the first antenna and the second antenna is less than the wavelength of the telecommunication signal. The second antenna causes the telecommunication signal to radiate on the opposite side of the first layer of the base sheet.

In one or more embodiments of the present invention, the first antenna is formed on the first layer of the base sheet using subtractive manufacturing.

In one or more embodiments of the present invention, the first antenna is formed on the first layer of the base sheet using additive manufacturing.

In one or more embodiments of the present invention, the first antenna is laminated on the first layer of the base sheet, and the second antenna is laminated on the second layer of the base sheet.

In one or more embodiments of the present invention, the first antenna is laminated using a lamination sheet that is a flexible substrate with a dielectric absorption loss less than a predetermined threshold value that is associated with a frequency range of the telecommunication signal.

In one or more embodiments of the present invention, the method further includes adding, to a third layer of the base sheet, a third antenna, wherein the second antenna transmits the telecommunication signal to the third antenna using near field coupling. A distance between the second antenna and the third antenna is less than the wavelength of the telecommunication signal. The third antenna causes the telecommunication signal to radiate on the opposite side of the first layer of the base sheet.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present invention is particularly pointed out and distinctly claimed in the claims at the conclusion of the specification. The foregoing and other features and advantages are apparent from the following detailed description taken in conjunction with the accompanying drawings in which:

Figure 1:
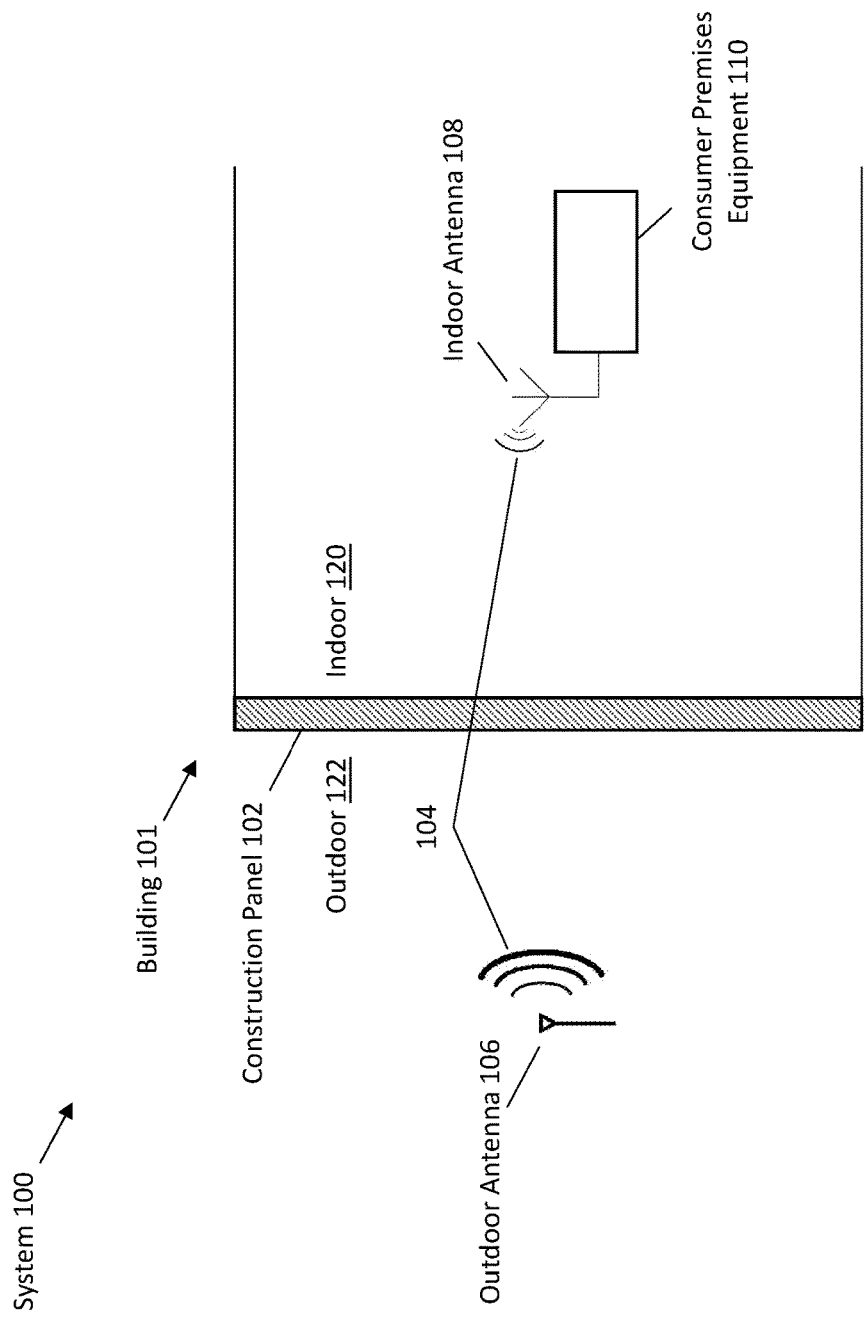
FIG. 1 depicts a block diagram of a system that facilitates wireless communication inside buildings by using construction panels configured to enhance the range of telecommunication signal according to one or more embodiments of the present invention.

It should be noted that the drawings herein may not be to scale. In the accompanying figures and following detailed description of the disclosed embodiments of the present invention, the various elements illustrated in the figures are provided with two, three, or four digit reference numbers. In most instances, the leftmost digit(s) of each reference number corresponds to the figure in which its element is first illustrated.

DETAILED DESCRIPTION

For the sake of brevity, conventional techniques related to making and using aspects of the invention may or may not be described in detail herein. In particular, various aspects of the materials, structures, computing systems, and specific computer programs to implement the various technical features described herein are well known. Accordingly, in the interest of brevity, many conventional implementation details are only mentioned briefly herein or are omitted entirely without providing the well-known system and/or process details.

For wireless telecommunications networks, and in particular microwave or millimeter-wave communication systems, establishing a wireless link between a first network node (e.g., antenna) that is outdoors from or at the periphery of a building, and a second network node (e.g., client device) that is indoors, can be difficult. Typically, such connections suffer a significant loss in power when propagating through an environment, such as an indoors environment, because of walls, windows, furniture, and other such surfaces and objects. In some cases, the loss in power can occur even when propagating the telecommunication signal between two antennas, both antennas being outdoor or indoor, because of surface absorption of the telecommunication signal. Fifth Generation (5G) systems, which are expected to enable a higher utilization capacity than current wireless systems, permitting a greater density of wireless users, with a lower latency are expected to transmit and receive in the Gigahertz band. For example, "Low-band 5G" and "Mid-band 5G" use frequencies from 600 Megahertz (MHz) to 6 Gigahertz (GHz). "High-band 5G" can use frequencies from 3.1 GHz to 5.0 GHz "Very High-band 5G" can use frequencies from 24 GHz to 44 GHz. It should be noted that particular bands within these ranges can be used for specific applications, geographies, network providers, etc., and that additional frequency ranges from those provided above may be used. A signal at a frequency of 44 GHz has a wavelength of 6.8 mm, hence some 5G signals are alternatively known as the millimeter wave ("mmWave") spectrum.

5G signals, however, have limited building penetration. In current wireless systems, the typical distance between adjacent antennas is about 1.5-3.2 kilometers (km). In contrast, for proposed advanced wireless systems, such as 5G systems, the distance between adjacent antennas may need to be reduced to about 200-300 meters. Therefore, next generation wireless systems may need as many as one hundred times the number of antennas as compared to current wireless systems. In other words, effective use of 5G frequencies for the telecommunications networks requires a greater cell density of communication nodes, relative to present systems.

Modern construction panels, such as drywall, glass, wood, Styrofoam, and other panels used for construction in buildings, etc., have metallic type coatings to aid in thermal transfer characteristics (i.e., to reflect infrared radiation but let light through). Such coatings attenuate radio frequency (RF) signals, thereby, limiting the range of communication nodes located in or near such buildings, and that use the 5G spectrum. Accordingly, technical challenges exist to communicatively link a wireless device, such as a customer premise equipment (CPE), with telecommunication network nodes, such as antennas, and limiting the propagation loss in such communication. The telecommunication network nodes can be indoors or outdoors. In 5G communications, the signals mostly rely on a line-of-sight propagation instead of the diffraction for 4G and earlier generation communication systems. For signal propagation, most of the high frequency signals may be blocked by surfaces such as walls, roofs, floors, appliances, furniture, etc. In addition, human body also blocks the 5G signals significantly.

A CPE, which can be placed indoors, may alleviate the outdoors-indoors propagation problem in some cases, but if the penetration of a communication signal from the outdoor communication node through the construction panel is attenuated, such alleviation by the CPE is also limited. Accordingly, technical challenges exist to communicatively link an outdoor wireless node with an indoor wireless device and limiting the propagation loss in such communication.

Embodiments of the invention described herein address the above-described shortcomings and technical challenges in wireless telecommunications networks by providing building construction panels having integrated antenna networks configured and arranged to couple transmission signals through the construction panel in a manner that minimizes attenuation loss in the transmission signal. In some embodiments of the invention, the integrated antenna network includes a first antenna on a first outer wall of the construction panel, along with a second antenna on a second outer wall of the construction panel. The first antenna uses a novel approach to near-field signal coupling to couple transmission signals from one side of the construction panel to the other side of the construction panel by coupling the transmission signal from the first antenna on the first outer wall of the construction panel to the second antenna on the second outer wall of the construction panel. In embodiments of the invention, the novel near-field coupling is implemented by ensuring that the wavelength of the telecommunication signal is more than a thickness of the construction panel.

By ensuring that the wavelength of the telecommunication signal is greater than the distance the telecommunications signal travels between the first and second antennas, power-loss in near-field coupling is reduced because an electromagnetic field that is generated from the first antenna is efficiently coupled and received by the second antenna without substantial decay. Particularly for signals in 5G frequencies, the construction panel can be more reflective and absorptive compared to other signals. If the distance between the two antennas is more than the wavelength of a signal that is incident on the construction panel, then the electromagnetic field generated from the first antenna decays before the field can interact with the second antenna, and the coupling efficiency reduces. Hence, in embodiments of the present invention, because the distance between the two successive antennas is less than the wavelength of the telecommunication signal, in the near-field region, the second antenna can receive the telecommunication signal via the electromagnetic field, and re-radiate telecommunication signal.

In embodiments of the invention, the wavelength of the transmission signal is more than a distance between the first antenna and the second antenna. Accordingly, embodiments of the invention described herein facilitate making and using a construction panel with a network of antennas configured to utilize the above-described novel near-field coupling technique that reduces the propagation loss in the communication signal between the CPE and wireless antennas. A construction panel fabricated in accordance with embodiments of the invention described herein will not impede or otherwise interfere with the normal functioning of the construction panel. For example, incorporating embodiments of the invention into a construction panel will not interfere with the construction panel's ability to provide advantages such as those noted herein regarding thermal transfer, thermal insulation, and such.

FIG. 1 depicts a block diagram of a system 100 that facilitates wireless communication inside a building 101. In embodiments of the invention, the system 100 includes an outdoor antenna 106, a construction panel 102, and an indoor antenna 108 that can be communicatively coupled to a CPE 110. In accordance with aspects of the invention, the construction panels 102 are configured and arranged to enhance range of, for example, a telecommunication signal 104 transmitted from the outdoor antenna 106 through the construction panel 102 to the indoor antenna 108. In aspects of the invention, the building 101 uses the construction panel 102 to separate the indoors 120 from the outdoors 122. For example, the construction panel 102 can be used as part of a wall, a window, a door, or any other element of the building 101. The building 101 can be an office building, a single-family house, a multi-family dwelling, a shop, a mall, or any other type of building. It is understood that although a single construction panel 102 is shown, the building 101 can be constructed using several instances of the construction panel 102.

A wireless telecommunications network, such as a 5G network, facilitates the CPE 110 to communicate with servers (not shown) and other devices, for example, using the Internet, cellular network, short messaging service, etc. Such communication is facilitated by the at least one outdoor antenna 106 sending and receiving data to/from the CPE 110. The indoor antenna 108 facilitates sending/receiving data by the CPE 110. The outdoor antenna 106 sends/receives data to/from the indoor antenna 108 using a telecommunication signal 104 ("signal") that has to pass through the construction panel 102. The signal 104 can be an electromagnetic or radio wave in the spectrum of frequencies used by the wireless telecommunications network. For example, the signal 104 can be in the 5G spectrum.

The outdoor antenna 106 can be a single antenna, an array of antennas, a cell tower, or any other device that transmits the signal 104 to the building 101. The CPE 110 can be any communication device, such as a computing device, phone, tablet, router, modem, television, or any other device that facilitates sending and receiving data using the signal 104.

It should be noted that although a single outdoor antenna 106 and a single CPE 110 are shown, in other example scenarios additional outdoor antennas and additional indoor CPEs can be part of the system 100 and communicate using the wireless telecommunications network.

As noted earlier, one or more layers in the construction panel 102 can include multiple layers. Each layer can have coatings and/or films such as metallic films, polarization films, privacy films, thermal films, decorative films, and other such applications or a combination thereof for improving a comfort level and/or décor of the area indoors 120. Such films, and the material used to manufacture the layers of the construction panel 102 can inhibit penetration of the signal 104 through the construction panel 102 in any direction, i.e., outdoor-to-indoor, indoor-to-outdoor, indoor-to-indoor, or outdoor-to-outdoor.

Figure 2:
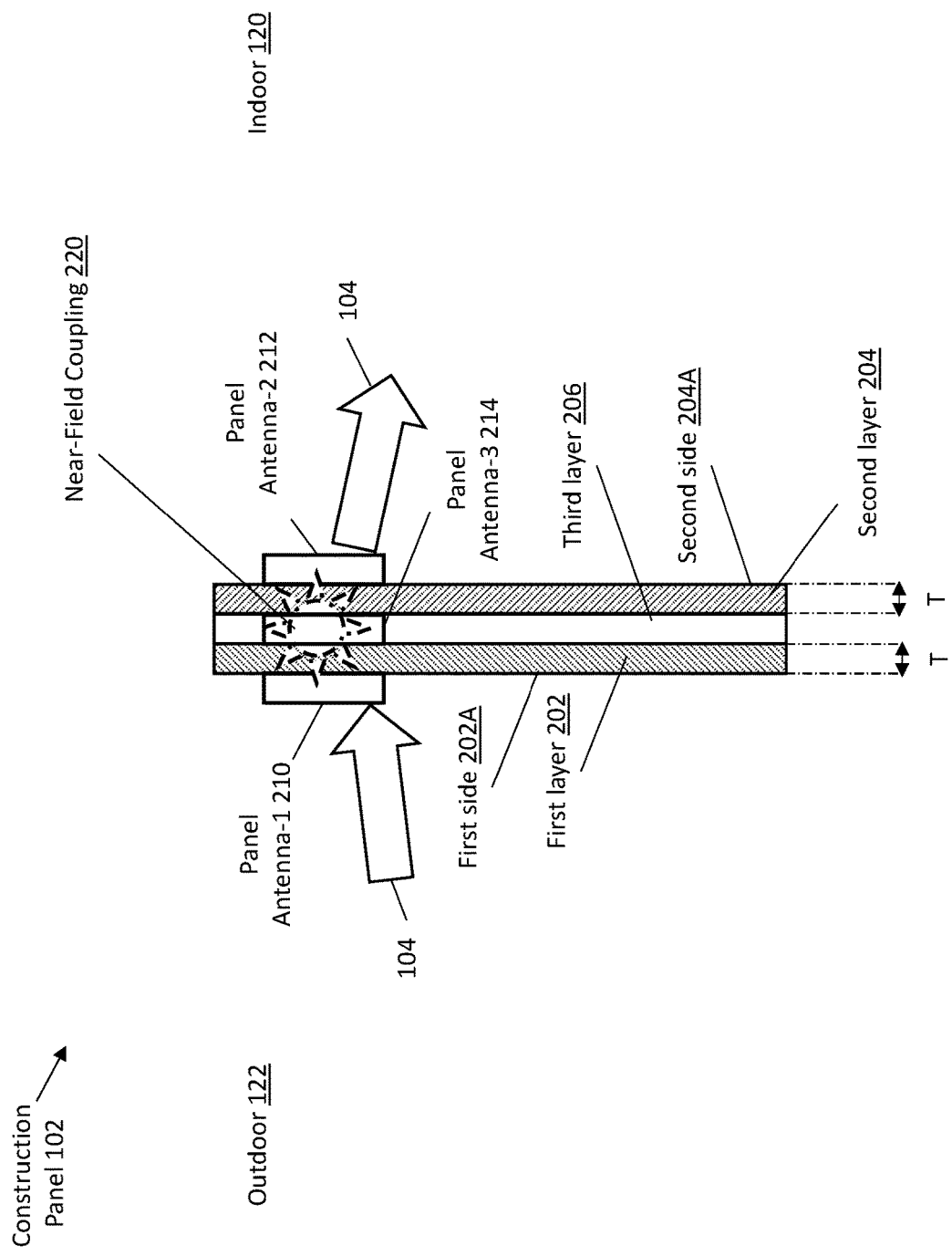
FIG. 2 depicts a block diagram of a structure of a construction panel according to one or more embodiments of the present invention.

FIG. 2 depicts a block diagram showing additional details of how the construction panel 102 can be implemented in accordance with one or more embodiments of the present invention. The construction panel 102 can be a low emittance (low-E) insulated glass panel in one or more embodiments of the present invention. To improve thermal control (insulation and solar optical properties) thin-film coatings are applied to glass panels, for example, using pyrolytic chemical vapor deposition, magnetron sputtering, etc. The glass sheet is said to have "low emissivity" once the coating increases an ability of the glass sheet to diminish heat transfer, thus saving heating and cooling costs, beyond a predetermined threshold. Such predetermined threshold can be based on standards such as ENERGY STAR®, etc.

Alternatively, or in addition, the construction panel 102 can be an insulated sandwich panel. In one or more embodiments of the present invention, the construction panel 102 is multi-layered and includes a first layer 202, a second layer 204, and a third layer 206 between the first and second layers 202, 204. In other examples, the construction panel 102 can be a CORIAN® panel. It should be noted that the construction panel 102 can include any type of panel from those exemplified herein.

The first layer 202 includes a first side 202A that is an exterior side of the construction panel 102. An "exterior side," in this case, refers to the side that faces the outdoors 122. The first layer 202 can include glass, fiber cement, ultra-high-performance concrete (UHPC), or any other material that benefits constructing the building 101. In some embodiments of the present invention, the first layer 202 can include dielectric material, such as porcelain (ceramic), mica, glass, plastics, and the oxides of various metals. In some embodiments of the present invention, the first layer 202 can include Tedlar®. In one or more embodiments of the present invention, the first layer 202 includes a Tedlar®/polyethylene terephthalate (PET) sheet facing the outdoors 122. In one or more embodiments of the present invention, the Tedlar®/PET sheet is laminated on the first side 202 of the construction panel 102.

In one or more embodiments of the present invention, the layers of the construction panel 102 include a second layer 204 that includes a second side 204A that is an interior side of the construction panel 102. Here, "interior side," refers to the side that faces the indoors 120. The second layer 204 can include glass, fiber cement, UHPC, or any other material that benefits constructing the building 101. In some embodiments of the present invention, the second layer 204 can include dielectric material, such as porcelain (ceramic), mica, glass, plastics, and the oxides of various metals. In some embodiments of the present invention, the second layer 204 can include Tedlar®. In some embodiments of the present invention, the second layer 204 includes a Tedlar®/polyethylene terephthalate (PET) sheet facing the indoors 120. In some embodiments of the present invention, the Tedlar®/PET sheet is laminated on the second layer 204 of the construction panel 102. The first layer 202 and the second layer 204 may or may not be made from the same material.

In one example, the construction panel 102 is vacuum-insulated, for example, vacuum insulated glass (VIG), with an evacuated space (i.e., vacuum) located between the first layer 202 and the second layer 204.

Alternatively, or in addition, multiple layers can exist between the first side 202 and the second side 204. FIG. 2 shows a third layer 206 between the first layer 202 and the second layer 204. It should be noted that although only a single layer, i.e., the third layer 206, is shown between the first layer 202 and the second layer 204, in other embodiments of the present invention, additional or fewer layers can exist between the first layer 202 and the second layer 204. As used herein, the third layer 206 can be any of such multiple intermediary layers between the first layer 202 and the second layer 204. The third layer 206 is polyethylene (PE), polyurethane (PU), polystyrene foam (Styrofoam), a mix of low-density polyethylene and mineral material, or any other material or a combination thereof. In other embodiments of the present invention, the third layer 206 can be made of other material than the examples described herein, such other material having similar characteristics related to absorption of the signal 104 as the materials listed herein.

In some embodiments of the present invention, the construction panel 102 includes additional layers (not shown), such as Tyvek® building envelope material, that are between the first layer 202 and the second layer 204. The construction panel 102 when formed from the materials described herein can provide improved sealing, thermal and noise insulating properties along with versatility, quality, and appealing visual appearance.

In embodiments of the present invention, the construction panel 102 is configured to include an integrated antenna network that includes a first panel-antenna 210 and a second panel-antenna 212. More specifically, the first layer 202 includes the first panel-antenna 210, and the second layer 204 includes the second panel-antenna 212. In accordance with aspects of the invention, the first panel-antenna 210 and the second panel-antenna 212 are configured to utilize novel near-field coupling 220 to send/receive data via the signal 104 in a wireless manner. In one or more embodiments of the present invention, the third layer 206 includes a third panel-antenna 214. The first panel-antenna 210 communicates with the second panel antenna 212 via the third antenna 214 using the near-field coupling 220. For example, the first antenna 210 transmits to (or receives from) the third antenna 214, which, in turn, transmits to (or receives from) the second antenna 212, the telecommunication signal 104. It should be noted that although, only three panel-antennas 210, 212, 214 are described herein, in one or more embodiments of the present invention, the construction panel 102 can include additional number of panel-antennas (for example, 4, 5, 6) that facilitate communication between the first panel-antenna 210 and the second panel-antenna 212 using the near-field coupling 220. It should be noted that examples herein describe the near-field coupling 220 between the two panel-antennas 210, 212, however, the near-field coupling 220 can be extended to work with more than two panel-antennas.

The panel-antennas 210, 212, are formed on the layers of the construction panel 102 either in an additive or subtractive manner. Photographic lithography can be used for forming the panel-antennas 210, 212. In one or more embodiments of the present invention, a laminated sheet can be made of a flexible substrate on which the panel-antenna(s) 210, 212 are etched, plated, or printed.

Etching includes adding a layer of metallic film on a substrate, and using lithography to define specific photoresist patterns on the metallic film. The pattern is used as a mask to etch the metallic film to form the panel-antennas 210, 212. Besides lithography, laser milling can also be used to selectively remove the metallic layer and generate the panel-antennas 210, 212 in one or more embodiments of the present invention. Alternatively, in one or more embodiments of the present invention, the panel-antennas 210, 212 are formed using plating. In plating, a continuous conductive seed layer is deposited on the substrate and a photoresist pattern is formed on the seed layer. Electroplating is subsequently performed to grow a metallic layer on the selected areas of the seed layer. The photoresist pattern is removed and the patterns for the panel-antennas 210, 212 are consequently formed. Alternatively yet, in one or more embodiments of the present invention, the panel-antennas 210, 212, are formed using printing. Printing can include, screen printing, inkjet printing or other such printing techniques that deposit conductive patterns on the substrate and form the panel-antennas 210, 212. It is understood that other additive and subtractive manufacturing techniques can be used to form the panel-antennas 210, 212 in other embodiments of the present invention, and the above are a few examples.

The laminated sheet is manufactured using non-metallic material that does not have strong absorption in the telecommunication signal's 104 frequency range. In other words, the dielectric absorption loss of the laminated sheet is less than a threshold (e.g. 0.1 decibel/millimeter, or any other such value). For example, the laminated sheet can be manufactured using at least one of Tyvek®, Tensylon®, PET, Polyimide, Polycarbonate, and any other material or a combination thereof. The laminated sheet can subsequently be affixed on the construction panel 102, for example, on both the first 202 and the second side 204. In an example, the laminated sheet is affixed using adhesive, fasteners, or any other technique or a combination thereof. The laminated sheet can be affixed at a specific position on the two or more sides of the construction panel 102 so as to align the panel-antennas 210, 212 on the different sides of the construction panel 102. Such alignment of the panel-antennas 210, 212 facilitates two or more corresponding panel-antennas 210, 212 to communicate the telecommunication signal 104 between themselves using near-field coupling.

A "near-field" is a region of electromagnetic field around an object (in this case, the antennas 210, 212). The electric field strength (E) and magnetic field strength (B) decrease with distance in the near-field. Typically, the radiative field decreases by the inverse-distance squared, the reactive field by an inverse cubed law, resulting in a diminished power in the parts of the electric field by an inverse fourth-power and sixth-power, respectively. Therefore, a technical challenge with near-field coupling is that the power contained in the near-field reduces a few wavelengths away from the radiating part (i.e., the antennas 210, 212).

In embodiments of the present invention, the construction panel 102 described herein addresses such technical challenges with near-field coupling by ensuring that the wavelength of the telecommunication signal 104 is more than the distance (D) from the first panel-antenna 210 to the second panel-antenna 212, which, in the embodiment of the invention depicted in FIG. 2, is substantially the same as a thickness (T) of the construction panel 102. In one or more embodiments of the present invention, the wavelength of the signal 104 is more than the distance (D) between the first panel-antenna 210 and the second panel-antenna 212, in case D T.

By ensuring that the wavelength of the telecommunication signal is greater than the distance the telecommunications signal travels between the first and second antennas, power-loss in near-field coupling is reduced because an electromagnetic field that is generated from the first antenna is efficiently coupled and received by the second antenna without substantial decay. Particularly for signals in 5G frequencies, the construction panel can be more reflective and absorptive compared to other signals. If the distance between the two antennas is more than the wavelength of a signal that is incident on the construction panel, then the electromagnetic field generated from the first antenna decays before the field can interact with the second antenna, and the coupling efficiency reduces. Hence, in embodiments of the present invention, because the distance between the two successive antennas is less than the wavelength of the telecommunication signal, in the near-field region, the second antenna can receive the telecommunication signal via the electromagnetic field, and re-radiate telecommunication signal.

For example, for a telecommunication signal 104 of frequency 28 GHz, the wavelength is $\lambda = 1.07$ centimeters. If the construction panel 102 is being used where the telecommunication signal 104 of such wavelength is prevalent, the distance D is configured to be less than $\lambda$, for example, 0.5 centimeters, 0.7 centimeters, or any other such value. It is understood that the telecommunication signal 104 can use other frequencies in the 5G spectrum in other embodiments of the present invention, and that D can be configured according to the frequency being used/prevalently used.

For the antennas with their sizes larger than the half of the wavelengths, the Fraunhofer distance $2L^2/\lambda$ is typically used as the boundary distance between near and far fields, where L is the largest dimension of the antenna and $\lambda$ is the wavelength of the telecommunication signal 104. It should be noted, that although FIG. 2 depicts the first panel-antenna 210 and the second panel-antenna 212 such that an inner surface of the panel-antenna 210 is substantially co-planar with the first side 202A, and such that an inner surface of the panel-antenna 212 is substantially co-planar with the second side 204A, other positions of the panel-antennas 210, 212 are contemplated. For example, in some embodiments of the invention, the panel-antennas 210, 212 can be partially or fully embedded within the first and second layers 202, 204, respectively, such that no surface of the panel-antennas 210, 212 is substantially co-planer with any surface of the first and second layers 202, 204. In some embodiments of the invention, the panel-antenna 210 is embedded fully or partially in the first layer 202 such that an outer surface of the panel-antenna 210 is substantially co-planer with the first side 202A. In some embodiments of the invention, the panel-antenna 212 is embedded fully or partially in the second layer 204 such that an outer surface of the panel-antenna 212 is substantially co-planer with the second side 204A.

Figure 3A:
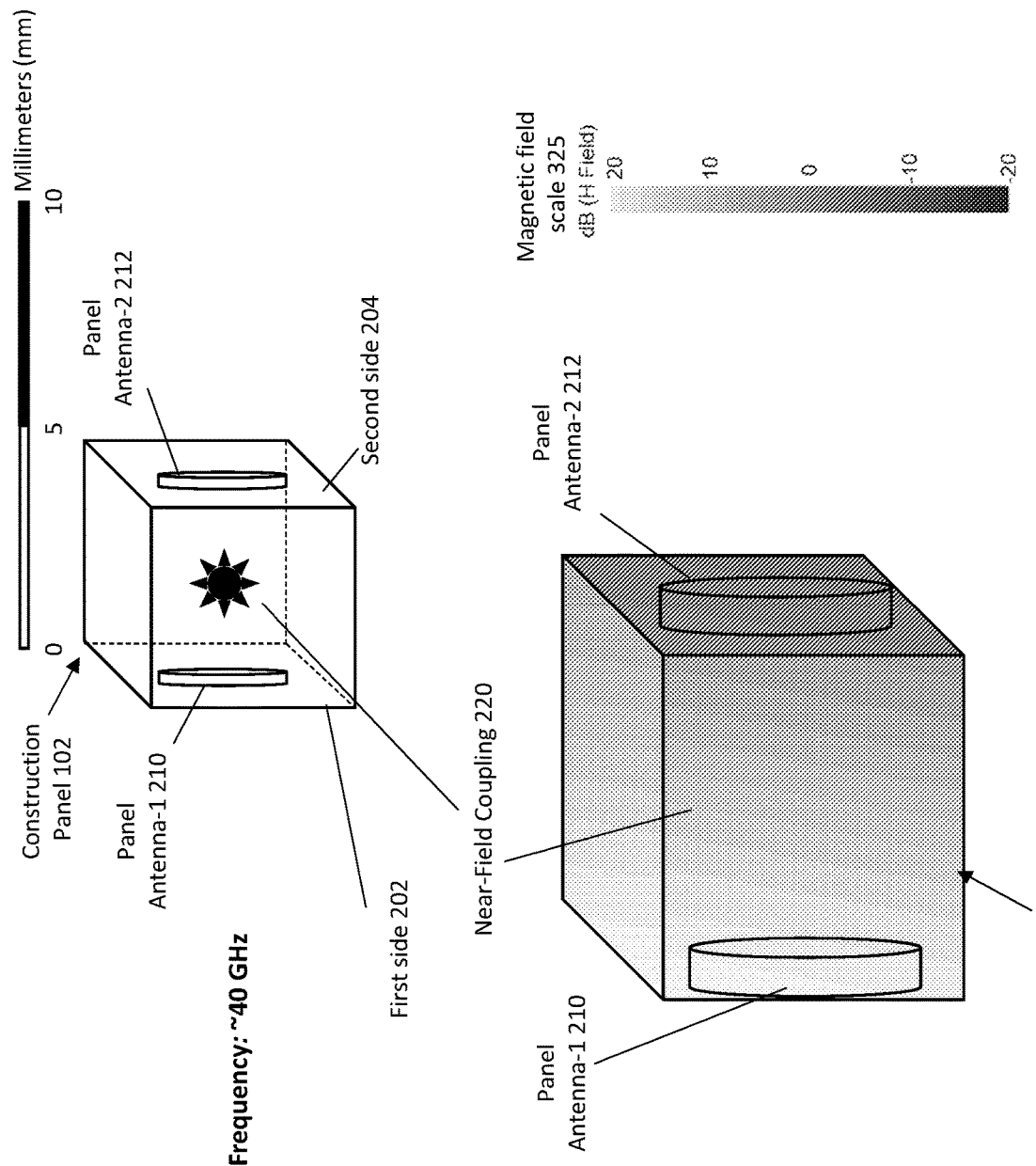
FIG. 3A depicts a block diagram of communication between panel-antennas of an integrated antenna network configured to use near-field coupling according to one or more embodiments of the present invention.

FIG. 3A depicts a block diagram of communication between the panel-antennas 210, 212 using the novel near-field coupling 220 described herein according to one or more embodiments of the present invention. It should be noted that not all the components of the system 100 are repeated in FIG. 3A, and that other figures herein depict such components. FIG. 3A depicts a three-dimensional view of the construction panel 102 with the first panel-antenna 210 and the second panel-antenna 212 on the first side 202A and the second side 204A of the construction panel 102, respectively. The near-field coupling 220 is shown in an expanded view. Further, a scale 325 depicts a near-field magnetic intensity between the first panel-antenna 210 and the second panel-antenna 212. A line attenuation (loss), which is a measure of how much the signal 104 has degraded between the first panel-antenna 210 and the second panel-antenna 212 follows the trend of the near-field magnetic intensity that is shown. FIG. 3A depicts an example scenario with a telecommunication signal 104 at frequency 40 GHz. The resulting magnetic field 222 is visualized. As can be seen, the attenuation is limited and the signal 104 is communicated between the antennas 210, 212, with attenuation (loss) below a predetermined threshold. The predetermined threshold can be configurable, for example to 0.1 decibel/millimeter, or any other value. It should be noted that the attenuation and other values can vary from those are depicted in FIG. 3A.

Figure 3B:
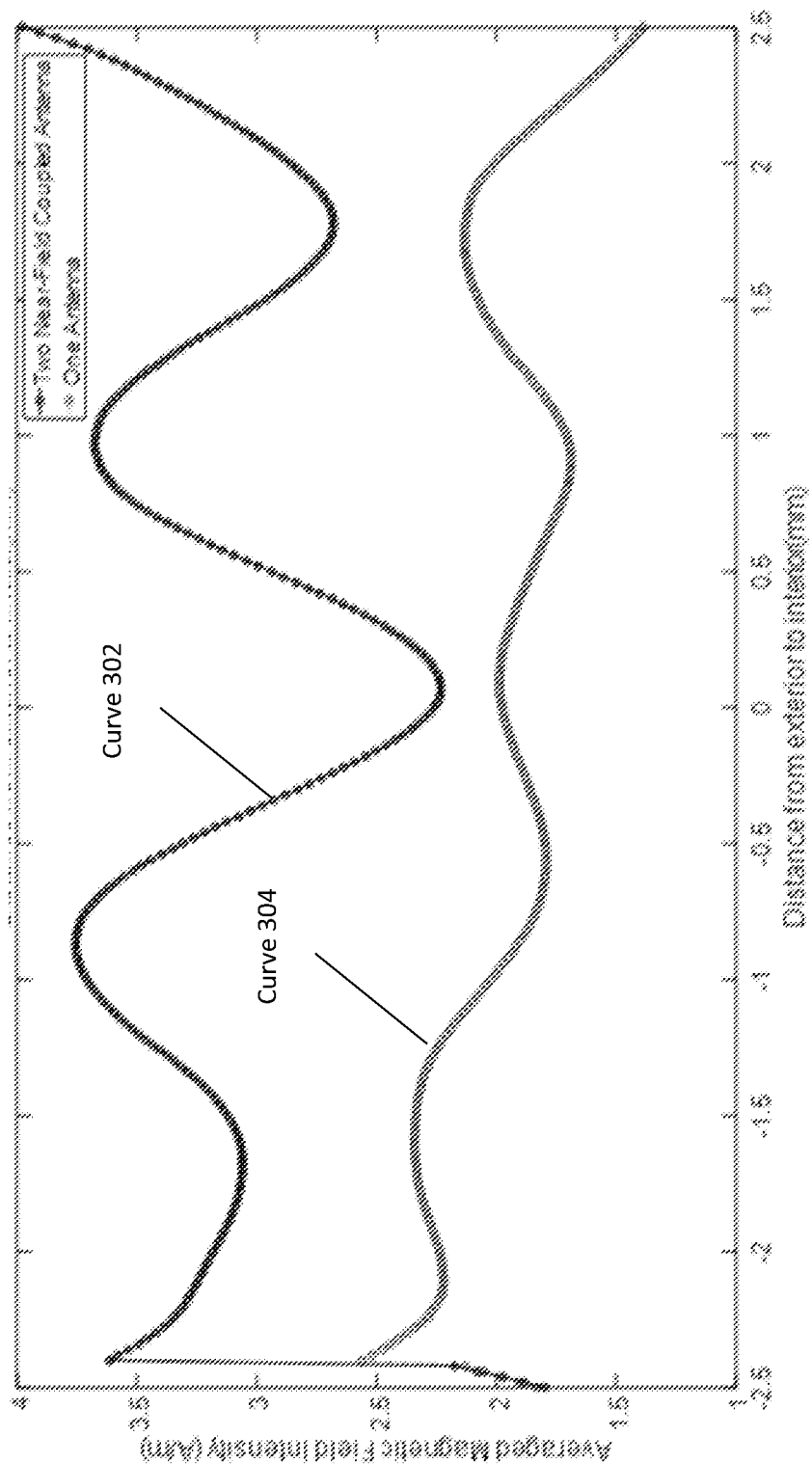
FIG. 3B shows the averaged near-field magnetic field intensity in an example glass panel.

FIG. 3B shows the averaged near-field magnetic field intensity in an example glass panel. It is understood that although the near-field magnetic field intensity in a glass panel is depicted, the construction panel 102 can be of any other material in other embodiments of the present invention. FIG. 3B illustrates an average magnetic field intensity of all x-y in-plane points at various distances from the exterior surface to the interior surface of the panel. The curve 302 depicts the magnetic field intensity at the various distances in the panel because of an incident signal 104, and as a result of using the near-field coupled antennas, the distance between the two antennas being less than the wavelength of the incident telecommunication signal, according to one or more embodiments of the present invention. For example, the wavelength of a telecommunication signal 104 of frequency 40 GHz is about 7.5 millimeters; and the distance between the antennas can be 5 millimeters. It is understood that the frequency of the signal, and the distance between the antennas can be different in other embodiments of the present invention. The curve 304 depicts the magnetic field intensity at the various distances in the panel because of an incident signal 104, and as a result of only one single antenna on the exterior surface of the panel. As can be seen, the magnetic field intensity is enhanced by using the panel-antennas 210, 212 for near-field coupling.

To facilitate the near-field coupling 220, in one or more embodiments of the present invention, the panel-antennas 210, 212 are printed antenna structures on the first side 202A and the second side 204A, respectively. In one or more examples, the panel-antennas 210, 212, are printed on the first and second sides 202A, 204A, respectively. Alternatively, or in addition, the various components of the construction panel 102 (e.g., the first layer 202 and the second layer 204) are assembled subsequent to the panel-antennas 210, 212 having been printed or etched on the first side 202A and the second side 204A.

Figure 4:
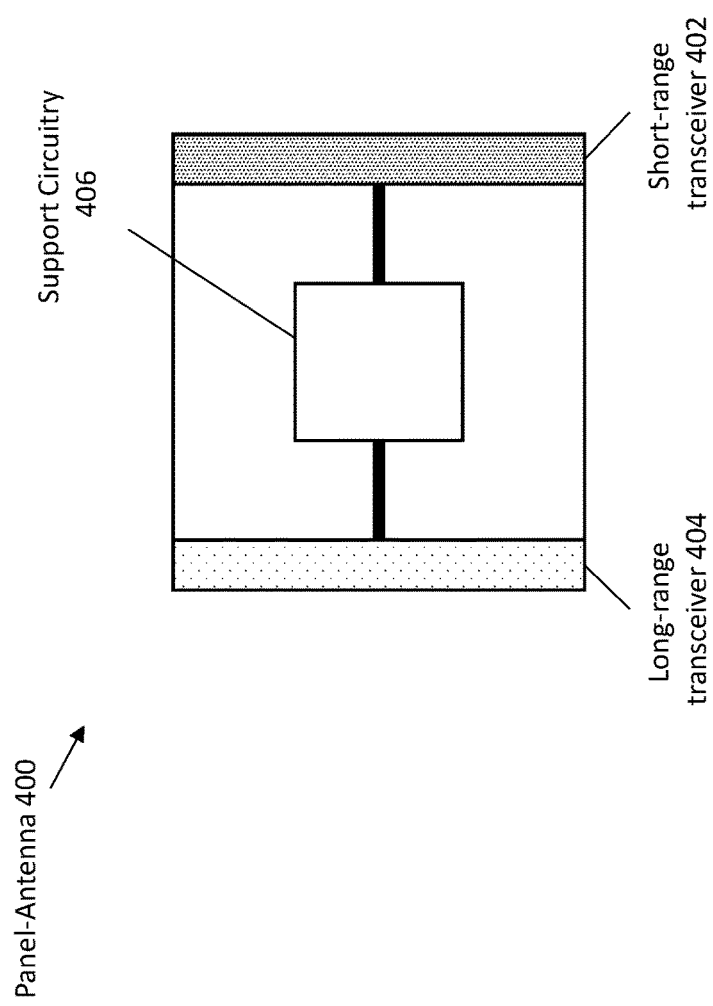
FIG. 4 depicts a block diagram illustrating details of how a window-antenna can be implemented according to one or more embodiments of the invention.

FIG. 4 depicts a block diagram illustrating a panel-antenna 400, which is an example of how the panel-antenna 210 and the second panel-antenna 212 can be implemented in accordance to one or more embodiments of the present invention.

The panel-antenna 400 includes a short-range transceiver 402, a long-range transceiver 404, and supporting circuitry 406. The short-range transceiver 402 can be an Archimedean spiral antenna in one or more examples. Alternatively, the short-range transceiver 402 can include patch antennas or microstrip lines. Other shapes of the short-range transceiver 402 can be used in other examples. The short-range transceiver 402 communicates the signal 104 to/from the short-range transceiver 402 of another (different) panel-antenna. In other words, the short-range transceiver 402 of two panel-antennas 400, for example, the first panel-antenna 210 and the second panel-antenna 212 communicate the signal 104 between each other using the near-field coupling 220. The short-range transceivers are unpowered antennas.

The long-range transceiver 404 can be any type of antenna that receives and/or transmits the signal 104 from/to the outdoor antenna 106 and/or the indoor antenna 108. For example, in the case of the first panel-antenna 210, the long-range transceiver 404 receives and transmits the signal 104 from/to the outdoor antenna 106, while in the case of the second panel-antenna 212, the long-range transceiver 404 receives and transmits the signal 104 from/to the indoor antenna 108. The long-range transceiver 404 can be a horn antenna, a patch antenna, or any other type of antenna that can transmit and receive telecommunication signals, such as 5G signals. The long-range transceiver 404 can radiate the signal 104 for reception by the outdoor antenna 106 (or the indoor antenna 108).

The support circuitry (or module) 406 processes the signal 104 that is received, either by the short-range transceiver 402 or by the long-range transceiver 404. For example, the support circuitry 406 amplifies the signal 104 using an amplifier or other components.

The short-range transceiver 402 receives the signal 104, which is to be sent using the near-field coupling 220, from the long-range transceiver 404. In the case of the first panel-antenna 202, which faces the outdoors 122, the long-range transceiver 404 sends/receives the signal 104 to/from the outdoor antenna 106. In the case of the second panel-antenna 212, which faces the indoors 120, the long-range transceiver 404 sends/receives the signal 104 to/from the indoor antenna 108.

Figure 5:
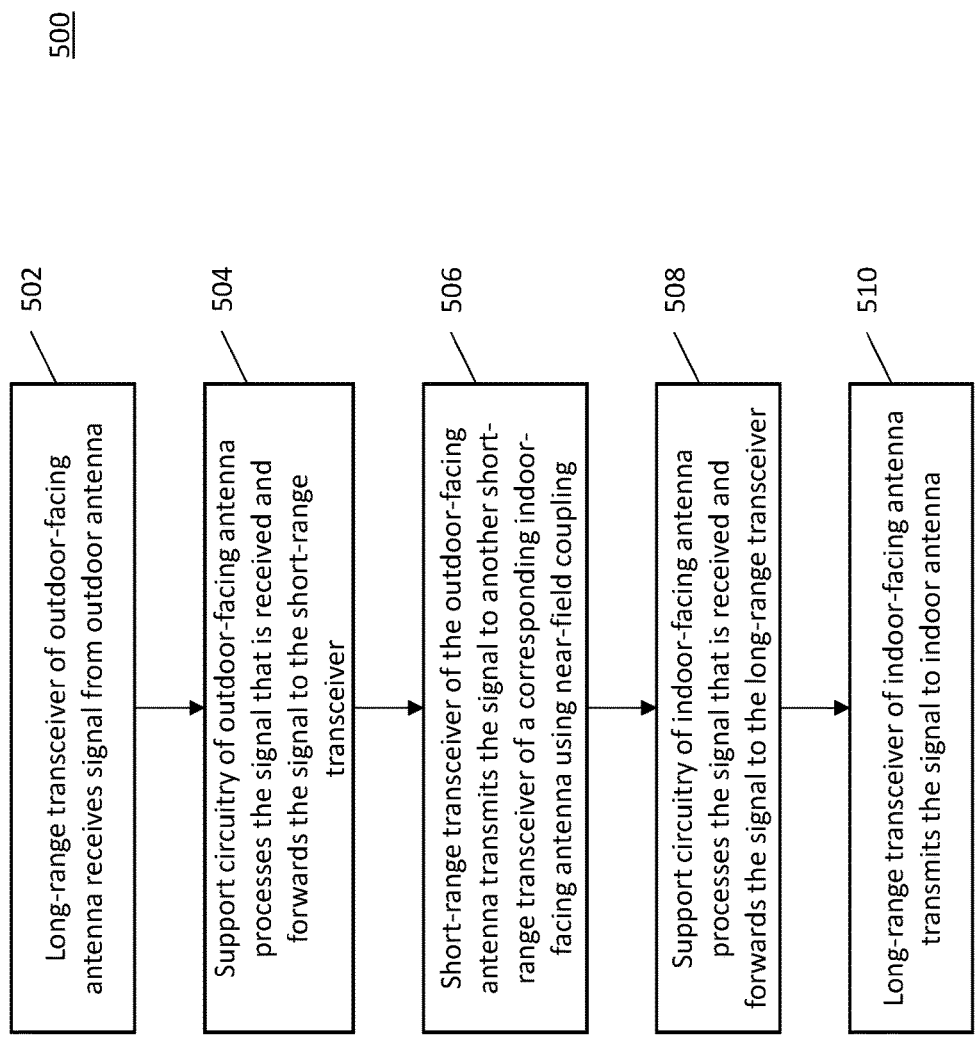
FIG. 5 depicts a flowchart illustrating a method of executing signal transmission from an outdoor antenna to consumer premises equipment according to one or more embodiments of the invention.

FIG. 5 depicts a flowchart of a method 500 that can be implemented by the system 100 (shown in FIG. 1) for transmitting the signal 104 from the outdoor antenna 106 through the construction panel 102 to the indoor antenna 108 and the CPE 110 according to one or more embodiments of the present invention. Long-range transceiver 404 of the first panel-antenna 210 receives the signal 104 that is transmitted by the outdoor antenna 106, at block 502 of method 500. The first panel-antenna 210 is on the first side 202 of the construction panel 102 and faces the outdoors 122.

In one or more embodiments of the present invention, the support circuitry 406 processes the signal 104 that is received by the long-range transceiver 404, at block 504. The support circuitry 406 subsequently forwards the signal 104 to the short-range transceiver 402, at block 504.

The short-range transceiver 402 transmits the signal 104 via the near-field coupling 220 to the second panel-antenna 212 on the other side, i.e., the second side 204, of the construction panel 102, at block 506. The second side 204 faces the indoors 120. The support circuitry 406 of the second panel-antenna 212 processes the signal 104 and forwards the signal 104 to the long-range transceiver 404 of the second panel-antenna 212, at 508. The long-range transceiver 404 subsequently transmits the signal 104 for reception by the indoor antenna 108, and in turn, the CPE 110, at block 510.

Figure 6:
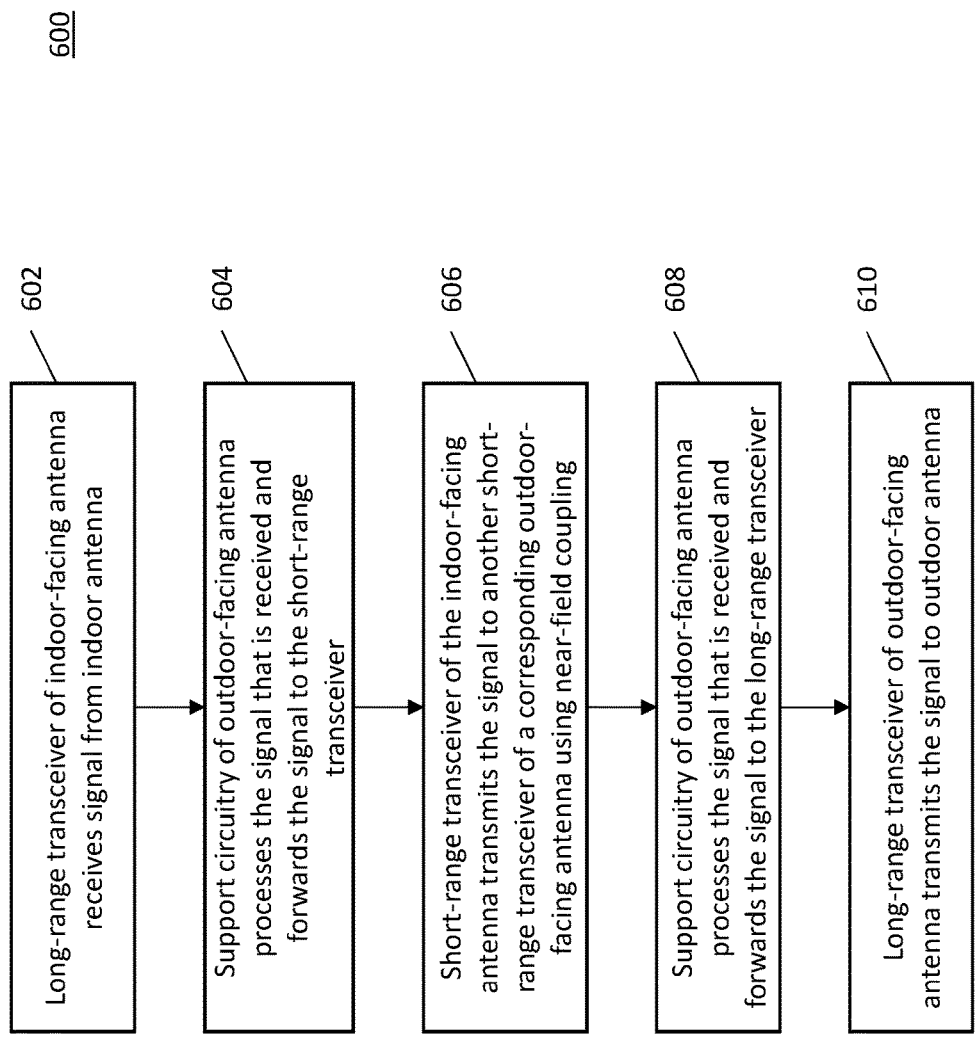
FIG. 6 depicts a flowchart illustrating a method of executing signal transmission from an indoor antenna to an outdoor antenna according to one or more embodiments of the invention.

FIG. 6 depicts a flowchart of a method 600 that can be implemented by the system 100 (shown in FIG. 1) for transmitting the signal 104 from the indoor antenna 108 of the CPE 110 to the outdoor antenna 106 according to one or more embodiments of the present invention. The transmission of data from the CPE 110 to the outdoor antenna 106, and in turn to the destination of the data, which can be a server, another CPE, or any other such destination device, operates in the opposite manner of the method 500 depicted in FIG. 5. In this case, the second panel-antenna 212 receives the signal 104 from the indoor antenna 108 and transmits the signal 104 to the first panel-antenna 210 via near-field coupling 220, at blocks 602 and 606 of the method 600. The first panel-antenna 210 subsequently transmits the signal 104 for reception by the outdoor antenna 106, at block 610. The support circuitry 406 of both panel-antennas 210, 212 can process the signal 104, before and after the signal 104 is transmitted via the near-field coupling, at block 604 and 608.

It should be noted that FIG. 2 depicts only single instances of the first panel-antenna 210 and the second panel-antenna 212 on either side of the construction panel 102. However, in other embodiments of the present invention, the construction panel 102 can have multiple panel-antennas on either side.

Figure 7:
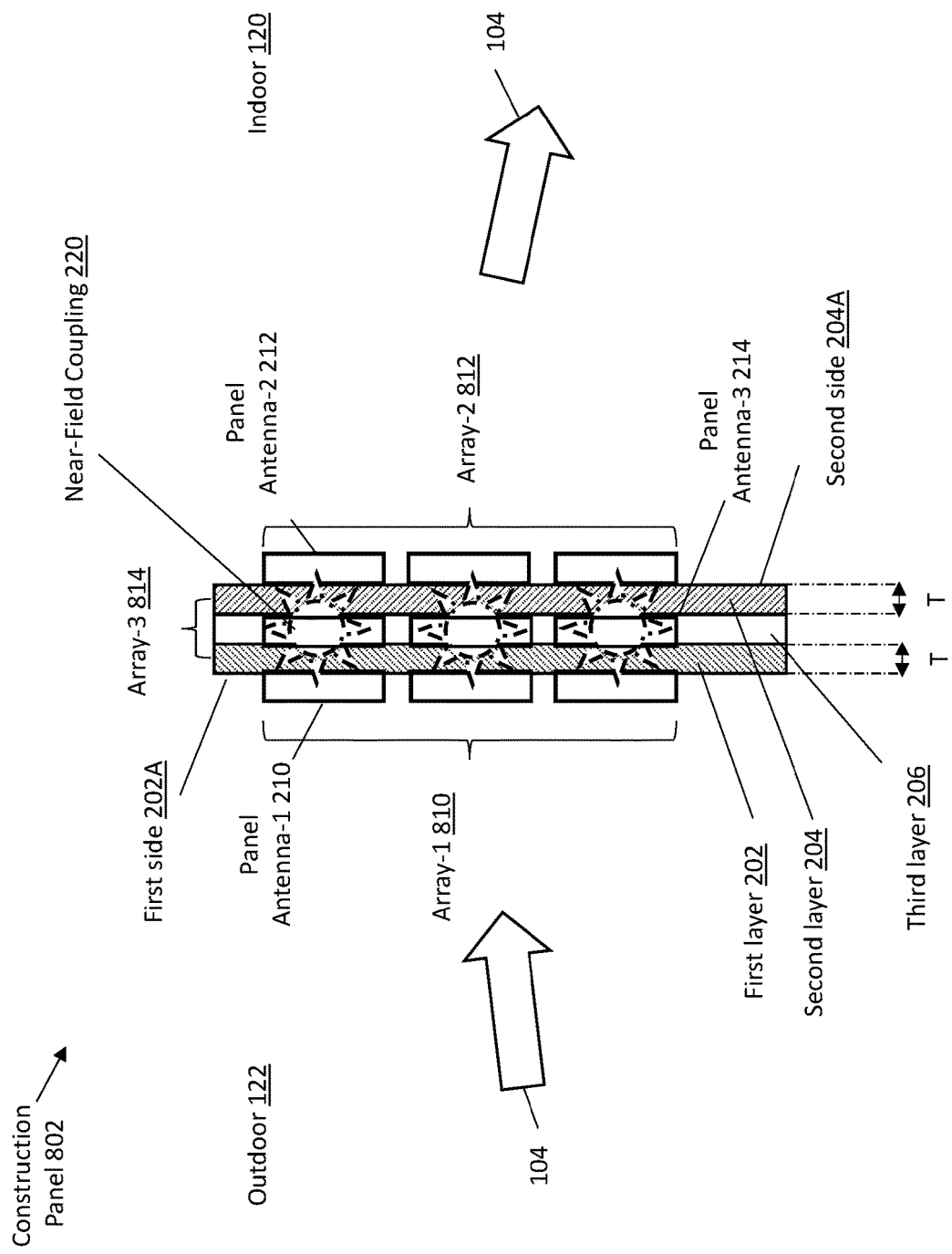
FIG. 7 depicts a block diagram of a structure of construction panel according to one or more embodiments of the invention.

FIG. 7 depicts a construction panel 802 according to one or more embodiments of the present invention where the integrated antenna network of the construction panel 802 includes multiple instance of the panel-antennas 210, 212. The construction panel 802 can be used in place of the construction panel 102 that is shown herein. In this case, the first side 202 includes a first array 810 of first panel-antennas 210. Similarly, the second side 204 can include a second array 812 of second panel-antennas 212, and the third layer includes a third array 814 of third panel-antennas 214. The panel-antenna(s) 210, 212, 214 are aligned with each other so that the near-field coupling 220 can facilitate communication of the signal 104 from the first side 202 to the second side 204 with less than the maximum prescribed attenuation threshold. In one or more embodiments of the present invention, the alignment of the panel-antennas 210, 212, 214 on the layers is within a predetermined offset. For example, the first panel-antenna 210 and a corresponding second panel-antenna are aligned and oriented so that the centers of the short-range transceivers of the two panel-antennas 210, 212 are substantially aligned transversely opposite to each other on the first side 202 and the second side 204, respectively. Here, substantially aligning the panel-antennas 210, 212 can include adding a predetermined offset in the two centers on either side of the construction panel 102. Further, aligning the two panel-antennas 210, 212 can include orienting the two panel-antennas 210, 212 such they are coaxial. Orienting the panel-antennas 210, 212 can include rotating the two panel-antennas 210, 212. Here, each array 810, 812, 814 can be considered an antenna by itself.

Embodiments of the present invention described herein address the technical challenge of facilitating a telecommunication signal to be transmitted with minimum attenuation into and through a building. Embodiments of the present invention herein address this technical challenge by using a construction panel that includes a first side that is used as an exterior side of a building and a second side that is used as an interior side of the building. In one or more embodiments of the present invention, the construction panel is made of glass. Both sides, the exterior side and the interior side, include one or more panel-antennas. The panel-antennas can be added to the sides by printing, etching, laminating, or using any other technique. In some examples, the glass panel can have a low emissivity coating.

Figure 8:
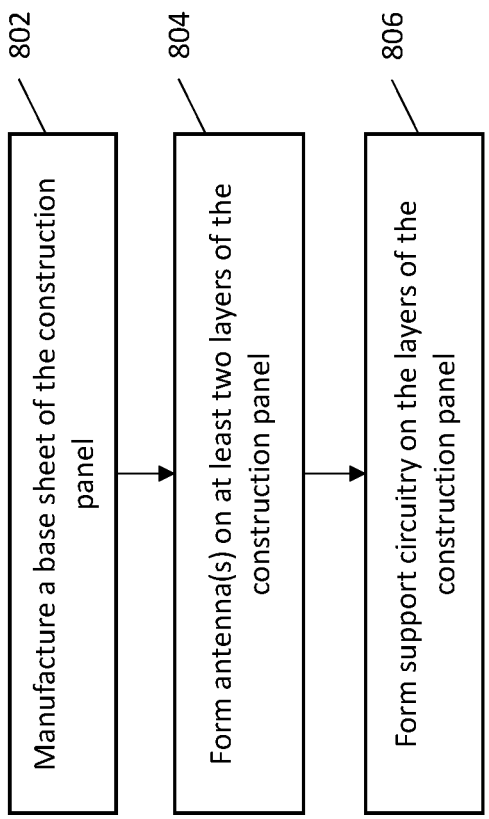
FIG. 8 depicts a flowchart illustrating a method to manufacture a construction panel according to one or more embodiments of the present invention.

FIG. 8 depicts a flowchart for manufacturing a construction panel according to one or more embodiments of the present invention. The method 800 includes manufacturing a base sheet, at block 802. The base sheet includes the first side 202 and the second side 204. In an example, the base sheet includes at least a third layer 206 between the first side 202 and the second side 204. The base sheet can be manufactured using known techniques. Further, at block 804, the panel-antennas 210, 212 are formed on the first side 202 and the second side 204, respectively.

In one or more embodiments of the present invention, the panel-antennas 210, 212 are added to the layers of the base sheet. The panel-antennas 210, 212 are screen-printed or plated using a predetermined pattern. In an example, adding the panel-antennas 210, 212 includes adding a layer of at least one of Tyvek®, Tensylon®, PET, polyimide, Polycarbonate, or a combination thereof, and forming the components on such a layer. The panel-antennas 210, 212 can be formed using printing, plating, three-dimensional printing, or any other additive manufacturing technique. The panel-antennas 210, 212 can be formed using a metal such as copper, aluminum, silver, carbon or any other metal or metallic-alloy that can facilitate the near-field coupling 220.

In one or more embodiments of the present invention, the panel-antennas 210, 212 are formed using subtractive manufacturing. For example, the panel-antennas 210, 212 are formed using, etching such as laser etching, chemical etching, or any other subtractive manufacturing techniques. In this case, the substrate film includes a metallic or metal-alloy layer, for example, a copper layer, that is photolithographically defined and etched to form the panel-antennas 210, 212.

In one or more embodiments of the present invention, the panel-antenna(s) 214 on the additional layers, for example, the third layer 206 are also formed similar to the panel-antennas 210, 212. In an example, the panel-antennas 214 on the intermediary layers are formed prior to the panel-antennas 210, 212, on the first side 202 and the second side 204.

Further, at block 806, the support circuitry 406, such as wires, etc. are screen-printed on the base sheet to facilitate the operation of the panel-antennas 210, 212. The wires, and the support circuitry 406 can be made of copper, aluminum, or any other conductive material. In addition, other support circuitry can be placed on the edge of the window and connected with the antenna through the printed wires.

The construction panel 102 can then be used in constructing one or more surfaces in the building 101.

Figure 9:
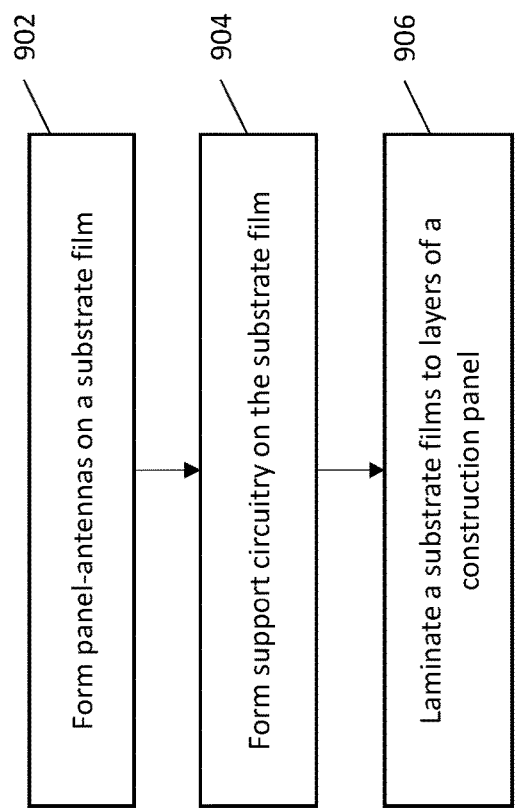
FIG. 9 depicts a flowchart illustrating a method to manufacture a construction panel according to one or more embodiments of the present invention.

FIG. 9 depicts a flowchart for manufacturing a construction panel according to one or more embodiments of the present invention. The method 900 includes forming one or more panel-antennas on a substrate film, at block 902. It should be noted that at the time of formation on the substrate film, it may not be known which side of the construction panel the panel-antennas are going to be affixed.

In one or more embodiments of the present invention, the panel-antennas 210, 212 are formed using additive manufacturing. The substrate film can be made of at least one of Tyvek®, Tensylon®, PET, Polyimide, Polycarbonate, or a combination thereof. The panel-antennas 210, 212, 214 are formed using printing, plating, three-dimensional printing, or any other additive manufacturing technique. The panel-antennas 210, 212, 214 can be formed using a metal such as copper, aluminum, silver, carbon or any other metal or metallic-alloy or electrically conductive materials that can facilitate the near-field coupling 220.

In one or more embodiments of the present invention, the panel-antennas 210, 212, 214 are formed using subtractive manufacturing. For example, the panel-antennas 210, 212, 214 are formed using, etching such as laser etching, chemical etching, or any other subtractive manufacturing techniques. In this case, the substrate film includes a metallic or metal-alloy layer, for example, a copper layer, that is photolithographically defined and etched to form the panel-antennas 210, 212, 214. In this case, the substrate film includes a metallic or metal-alloy layer, for example, a copper layer, that is photolithographically defined and etched to form the panel-antennas.

At block 904, supporting circuitry is formed on the substrate film. The support circuitry can be formed on the substrate film using additive manufacturing in one case. In another embodiment of the present invention, the support circuitry is formed on the substrate film using subtractive manufacturing.

At block 906, two or more substrate films, with the panel-antennas formed on each of them, are affixed on two or more layers of the base sheet. The base sheet includes at least the first side 202 and the second side 204. In an example, the base sheet includes a third layer 206 and other layers between the first side 202 and the second side 204. The base sheet can be manufactured using known techniques. The substrate films are affixed to the layers of the base sheet, for example, using lamination, fasteners, or any other techniques. The positions of the substrate films on the respective layers are aligned so that the panel-antennas on each two successive sides (e.g., 202, 204) are substantially aligned to facilitate the communication of the telecommunication signal 104 via near-field coupling 220.

The substrate film(s) can be laminated on construction panels 102 that are already in use in the building 101. Alternatively, or in addition, the substrate film(s) can be laminated on construction panels 102, which are subsequently used in construction.

Embodiments of the present invention described herein facilitate manufacturing the construction panel 102 with corresponding panel-antennas 210, 212 on opposite sides, where the panel-antennas 210, 212 transmit a telecommunication signal 102 between each other using near-field coupling 220, and in turn reduce attenuation loss of the telecommunication signal 104 when penetrating the construction panel 102. In one or more embodiments of the present invention, the construction panel 102 includes additional panel-antennas (e.g., 214) that facilitate the transfer of the telecommunication signal 104 between the first panel-antenna 210 and the second panel-antenna 212. Embodiments of the present invention provide a practical application to improve the telecommunications networks by improving the range of the telecommunication signal 104, particularly inside buildings that use the construction panel(s) 102.

In one or more embodiments of the present invention, a computer readable storage medium can store computer executable instructions, which when executed by one or more processing units, cause the one or more processing units to perform a method described herein.

In the present description, the terms "computer program medium," "computer usable medium," "computer program product," and "computer readable medium" are used to generally refer to media such as memory. Computer programs (also called computer control logic) are stored in memory. Such computer programs, when run, enable the computer system to perform the features of the present invention as discussed herein. In particular, the computer programs, when run, enable the controller to perform the features and operations described herein. Accordingly, such computer programs can controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Many of the functional units described in this specification have been labeled as modules. Embodiments of the present invention apply to a wide variety of module implementations. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, comprise the module and achieve the stated purpose for the module.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Additionally, the term "exemplary" and variations thereof are used herein to mean "serving as an example, instance or illustration." Any embodiment or design described herein as "exemplary" is not necessarily to be construed as preferred or advantageous over other embodiments or designs. The terms "at least one," "one or more," and variations thereof, can include any integer number greater than or equal to one, i.e. one, two, three, four, etc. The terms "a plurality" and variations thereof can include any integer number greater than or equal to two, i.e., two, three, four, five, etc. The term "connection" and variations thereof can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The phrases "in signal communication, "in communication with," "communicatively coupled to," and variations thereof can be used interchangeably herein and can refer to any coupling, connection, or interaction using electrical signals to exchange information or data, using any system, hardware, software, protocol, or format, regardless of whether the exchange occurs wirelessly or over a wired connection.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A construction panel comprising:
   a plurality of layers comprising a first layer and a second layer;
   a first antenna on the first layer, the first antenna transfers a telecommunication signal that is incident on the first layer; and
   a second antenna on the second layer, wherein the first antenna transmits the telecommunication signal to the second antenna through the first layer using near field coupling, a wavelength of the telecommunication signal being more than a distance between the first antenna and the second antenna, and wherein the second antenna causes the telecommunication signal to radiate on the opposite side of the first layer.

2. The construction panel of claim 1, wherein the first antenna comprises an array of antennas.

3. The construction panel of claim 1, wherein the second antenna comprises an array of antennas.

4. The construction panel of claim 1, wherein the first antenna is added to the first layer using one of etching, printing, plating, and laminating.

5. The construction panel of claim 1, further comprising a third antenna on a third layer from the plurality of layers, wherein the second antenna transmits the telecommunication signal to the third antenna using near field coupling, a wavelength of the telecommunication signal being more than a distance between the second antenna and the third antenna, and wherein the third antenna causes the telecommunication signal to radiate on the opposite side of the first layer.

6. The construction panel of claim 1, wherein the first antenna is laminated on an exterior surface of the first layer.

7. The construction panel of claim 6, wherein the first antenna is laminated using a lamination sheet that is a flexible substrate with a dielectric absorption loss less than a predetermined threshold value that is associated with a frequency range of the telecommunication signal.

8. The construction panel of claim 1, wherein the first antenna is printed on the first side.

9. The construction panel of claim 1, wherein the second antenna is aligned with the first antenna at a predetermined offset and orientation.

10. The construction panel of claim 7, wherein the predetermined offset reduces the attenuation loss and reflection loss of the telecommunication signal through the first layer.

11. The construction panel of claim 1, wherein the first layer is on an exterior side of the construction panel, the exterior side being an exposed part of a building, and the second layer is on an interior side of the construction panel, the interior side facing inside the building.

12. The construction panel of claim 11, wherein the second antenna that is on the interior side of the construction panel is connected to a transceiver.

13. The construction panel of claim 1, wherein the first antenna and the second antenna are unpowered antennas.

14. The construction panel of claim 1, wherein the construction panel is a glass sheet that has a low emissivity coating.

15. A method to manufacture a construction panel, the method comprising:
   adding, to a first layer of a base sheet, a first antenna, the first antenna transfers, through the base sheet, a telecommunication signal that is incident on the first layer of the base sheet; and
   adding, to a second layer of the base sheet, a second antenna, wherein the first antenna transmits the telecommunication signal to the second antenna using near field coupling, a distance between the first antenna and the second antenna is less than the wavelength of the telecommunication signal, and wherein the second antenna causes the telecommunication signal to radiate on the opposite side of the first layer of the base sheet.

16. The method of claim 15, wherein the first antenna is formed on the first layer of the base sheet using subtractive manufacturing.

17. The method of claim 15, wherein the first antenna is formed on the first layer of the base sheet using additive manufacturing.

18. The method of claim 15, wherein the first antenna is laminated on the first layer of the base sheet, and the second antenna is laminated on the second layer of the base sheet.

19. The method of claim 18, wherein the first antenna is laminated using a lamination sheet that is a flexible substrate with a dielectric absorption loss less than a predetermined threshold value that is associated with a frequency range of the telecommunication signal.

20. The method of claim 18, further comprising, adding, to a third layer of the base sheet, a third antenna, wherein the second antenna transmits the telecommunication signal to the third antenna using near field coupling, a distance between the second antenna and the third antenna is less than the wavelength of the telecommunication signal, and wherein the third antenna causes the telecommunication signal to radiate on the opposite side of the first layer of the base sheet.

* * * * *